(12) United States Patent
Sheikh

(10) Patent No.: US 10,863,057 B2
(45) Date of Patent: Dec. 8, 2020

(54) SYNCHRONIZING IMAGE CAPTURES IN MULTIPLE SENSOR DEVICES

(71) Applicant: Hamid Rahim Sheikh, Allen, TX (US)

(72) Inventor: Hamid Rahim Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/904,068

(22) Filed: Feb. 23, 2018

(65) Prior Publication Data
US 2019/0068842 A1    Feb. 28, 2019

Related U.S. Application Data

(60) Provisional application No. 62/551,905, filed on Aug. 30, 2017.

(51) Int. Cl.
H04N 5/04       (2006.01)
H04N 5/232      (2006.01)
H04N 5/225      (2006.01)

(52) U.S. Cl.
CPC ............ *H04N 5/04* (2013.01); *H04N 5/2258* (2013.01); *H04N 5/2329* (2013.01); *H04N 5/23229* (2013.01); *H04N 5/23232* (2013.01)

(58) Field of Classification Search
None
See application file for complete search history.

(56) References Cited

U.S. PATENT DOCUMENTS

| 7,319,423 | B2 | 1/2008 | Augusto |
| 7,518,540 | B2 | 4/2009 | Augusto |
| 8,269,868 | B2 | 9/2012 | Olmstead |
| 8,988,504 | B2 | 3/2015 | Baer |
| 9,407,837 | B2 | 8/2016 | Lee |
| 9,557,520 | B2 | 1/2017 | Laroia |
| 2001/0040631 | A1* | 11/2001 | Ewedemi ........... H04N 1/00307 348/294 |
| 2008/0024633 | A1 | 1/2008 | Hofer |
| 2010/0157020 | A1 | 6/2010 | Choi et al. |
| 2011/0267520 | A1 | 11/2011 | Pyanet |
| 2013/0278802 | A1 | 10/2013 | Attar |
| 2014/0354850 | A1 | 12/2014 | Kosaka et al. |
| 2015/0170104 | A1* | 6/2015 | Yamada ............. G06Q 10/1091 705/32 |
| 2015/0296154 | A1* | 10/2015 | Laroia ................ G02B 13/0065 348/262 |

(Continued)

FOREIGN PATENT DOCUMENTS

| EP | 2382583 | 11/2011 |
| WO | 2010075202 | 1/2010 |

OTHER PUBLICATIONS

EP Application No. 18849867.9 European Search Report, dated Mar. 30, 2020.

*Primary Examiner* — Samira Monshi

(74) *Attorney, Agent, or Firm* — John J. King

(57) ABSTRACT

A method of synchronizing images from multiple image sensors having different properties is described. The method comprises synchronizing a capture of a first image using a first image sensor and a capture of a second image using a second image sensor; and storing at least one of (a) the captured first image on an on-sensor memory of the first image sensor, or (b) the captured second image on an on-sensor memory of the second image sensor.

20 Claims, 5 Drawing Sheets

(56) References Cited

U.S. PATENT DOCUMENTS

| | | |
|---|---|---|
| 2016/0014314 A1 | 1/2016 | Laroia |
| 2016/0219217 A1 | 7/2016 | Williams et al. |
| 2016/0261807 A1 | 9/2016 | Seshadrinathan |
| 2016/0316164 A1 | 10/2016 | Shen |
| 2016/0360183 A1 | 12/2016 | Lu et al. |
| 2017/0187981 A1 | 6/2017 | Park et al. |

* cited by examiner

SYNCHRONIZING IMAGE CAPTURES IN MULTIPLE SENSOR DEVICES

FIELD OF THE INVENTION

An embodiment of the invention relates generally to devices that capture an image, and in particular, to a method of synchronizing images from multiple image sensors having different properties.

BACKGROUND OF THE INVENTION

For multi-camera systems using CMOS camera sensor technology in typical consumer electronics form factors, such as the smartphone for example, mechanical shutters could be used for synchronization. Mechanical shutters allow the sensors to be exposed globally at the same time. However, mechanical shutters are expensive, bulky, failure prone, and also not useful for capturing video.

Some CMOS sensors offer a global shutter mode, where additional circuitry is able to hold charge temporarily. However, such CMOS sensors typically have higher noise and poorer image quality. In a multi-camera system, it is also possible to slow down all the sensors to match to the slowest camera. Such a modification may make the system too slow overall, may also make dynamic adjustment of camera parameters difficult, and may cause both system slow-downs and frame drops. Some existing solutions may also address both parallax and object motion by using a processing unit receiving the image data. By trying to solve this ill-posed problem, image quality may be sacrificed.

Even if a frame start is synchronized during the capture of multiple images, the rest of the image may not be captured synchronously in conventional devices, where they may rely on best effort synchronization.

Accordingly, there is a need for improved synchronization of image data in multi-camera systems.

SUMMARY OF THE INVENTION

A method of synchronizing images from multiple image sensors having different properties is described. The method comprises implementing a first image sensor configured to capture a first image; implementing a second image sensor configured to capture a second image; synchronizing the capture of the first image and the second image; and storing captured image data for at least one of the first image sensor and the second image sensor on a memory of the at least one of the first image sensor and the second image sensor.

An electronic device is also described. The electronic device comprises a first image sensor configured to capture a first image; a second image sensor configured to capture a second image; and a processor, wherein the processor: synchronizes the capture of the first image and the second image; and stores captured image data for at least one of the first image sensor and the second image sensor on a memory of the at least one of the first image sensor and the second image sensor A non-transitory computer-readable storage medium having data stored therein is further described, where the data represents instructions executable by a processor to perform a method comprising synchronizing a capture of a first image using a first image sensor and a capture of a second image using a second image sensor; and storing at least one of (a) the captured first image on an on-sensor memory of the first image sensor, or (b) the captured second image on an on-sensor memory of the second image sensor.

DETAILED DESCRIPTION OF THE DRAWINGS

Multi-camera systems may often be used in high quality consumer digital photography, where dual cameras in mobile phones are commonly used. Synchronizing the image capture of 2 or more heterogeneous cameras is critical for many applications, such as applications requiring different resolutions or focal lengths, or where rolling shutters in CMOS applications complicate the synchronization processing.

The circuits and methods set forth below describe CMOS image sensors having memory that allow the sensors to perform an analog-to-digital (A/D) conversion at much higher rates than supported by interface speeds associated with other portions of the circuit enabling image capture, such as an interface to a processing unit. Additionally, DRAM can be integrated on the sensors with high bandwidth local interfaces. Using DRAM memory and fast A/D conversion in the local interface, multiple camera systems can be synchronized more effectively. By performing A/D conversion at a rate that matches the fastest sensor in the system (i.e. based upon field-of-view captured per unit time), saving the results in on-sensor DRAM, and transmitting the saved data on-demand over slower interfaces (which may be shared by multiple cameras), the circuits and methods circumvent the limitation of existing interfaces and allows for effective time synchronization of image captures. By synchronizing image captures in multi-camera devices, the circuits and methods set forth below allow processing units, also generally known as processors, to only correct for parallax, and therefore not have to correct for both parallax and motion in an ill-posed situation.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
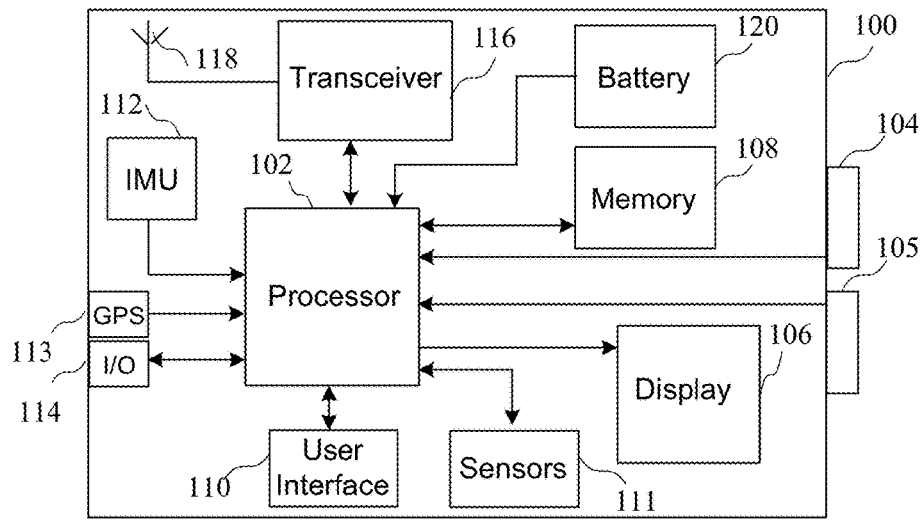
FIG. 1 is an exemplary block diagram of an electronic device having multiple cameras.

Turning first to FIG. 1, a block diagram of an electronic device having multiple cameras is shown. The exemplary electronic device 100 that may be any type of device having multiple cameras. The mobile device 100 may comprise a processor 102 coupled to a plurality of cameras 104 and 105. While cameras 104 and 105 are shown, it should be understood that the cameras comprise image sensors, and that the cameras may be independent of each other or may share circuitry. The mobile device 100 could be any type of device adapted to transmit and receive information, such as a smart phone, tablet or other electronic device receiving or providing information, such as a wearable device. The processor circuit 102 could be an ARM processor, an X86 processor, a MIPS processor, a graphics processing unit (GPU), a general purpose GPU, or any other processor configured to execute instructions stored in a memory. The processor circuit 102 could be implemented in one or more processing devices, where the processors may be different. For example, the electronic device could include a central processing unit (CPU) as well as a GPU for example.

The processor 102 may be coupled to a display 106 for displaying information to a user. The processor 102 may also be coupled to a memory 108 that allows storing information related to data or information associated with achieving a goal. The memory 108 could be implemented as a part of the processor 102, or could be implemented in addition to any cache memory of the processor, as is well known. The memory 108 could include any type of memory, such as a solid state drive (SSD), Flash memory, Read Only Memory (ROM) or any other memory element that provides long term memory, where the memory could be any type of internal memory of the electronic drive or external memory accessible by the electronic device.

A user interface 110 is also provided to enable a user to both input data and receive data. Some activity tracking may require user's manual input. The user interface could include a touch screen user interface commonly used on a portable communication device, such as a smart phone, smart watch or tablet computer, and other input/output (I/O) elements, such as a speaker and a microphone. The user interface could also comprise devices for inputting or outputting data that could be attached to the mobile device by way of an electrical connector, or by way of a wireless connection, such as a Bluetooth or a Near Field Communication (NFC) connection.

The processor 102 may also be coupled to other elements that receive input data or provide data, including various sensors 111, an inertial measurement unit (IMU) 112 and a Global Positioning System (GPS) device 113 for activity tracking. For example, an inertial measurement unit (IMU) 112 can provide various information related to the motion or orientation of the device, while GPS 113 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information related to achieving a goal. The processor circuit 102 may receive input data by way of an input/output (I/O) port 114 or a transceiver 116 coupled to an antenna 118.

Figure 2:
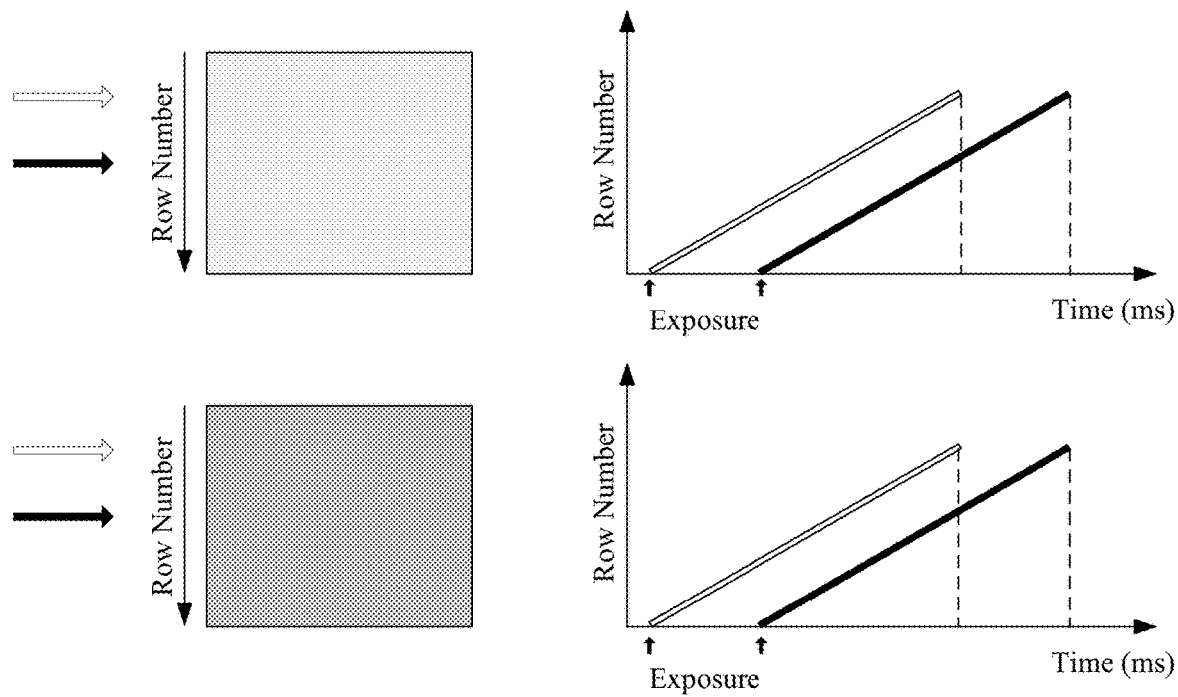
FIG. 2 is an exemplary diagram showing the capture of image data using dual cameras that are matched.

Turning now to FIG. 2, a diagram shows the capture of image data using dual cameras that are matched. While two cameras are shown by way of example in the figures below, it should be understood that additional cameras could be implemented according to the various circuits and methods described. Images from multiple cameras which are matched (i.e. have similar properties) are easily combined. However, the use of multiple cameras having different properties enables improving the quality of images, such as by providing improved low light capability, optical zoom or other features. Images from multiple cameras are combined using different algorithms to improve the quality over an image provided by a single-camera system.

Conventional products using CMOS sensors with Electronic Rolling Shutters (ERS) are limited in the exposure and read-out of image data from camera sensor to processing unit. CMOS sensors with ERS must expose sensor pixels line-by-line and control exposure digitally. As a result, there is never one "instant" of photo capture, but rather the top part of the image is exposed first, and the bottom part of image is exposed several milliseconds later (for example approximately 30 ms later). The time difference between the top line and the bottom line of the image may be constrained by different factors, including analog-to-digital conversion throughput and interface speed between a camera sensor and a processing unit for example.

In addition to ERS, multi-camera systems also have to account for parallax, which is a result of the cameras not having aligned optical axes. That is, the different cameras have a baseline between them, and different objects in the scene at different depths are observed by the cameras with a slightly different point of view, causing a parallax effect in the output images. A downstream processing unit (PU) must be able to handle parallax when it combines images from multiple cameras to produce one unified image.

Figure 3:
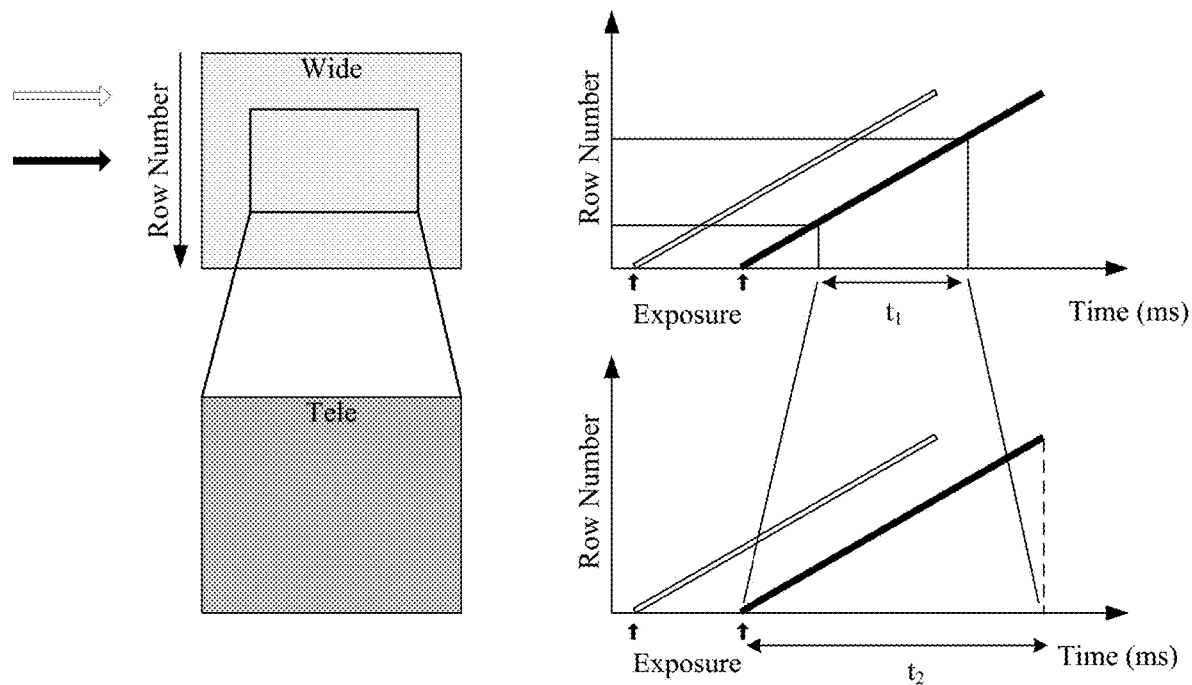
FIG. 3 is an exemplary diagram showing timing differences in capturing image data using wide angle and tele cameras.
Figure 4:
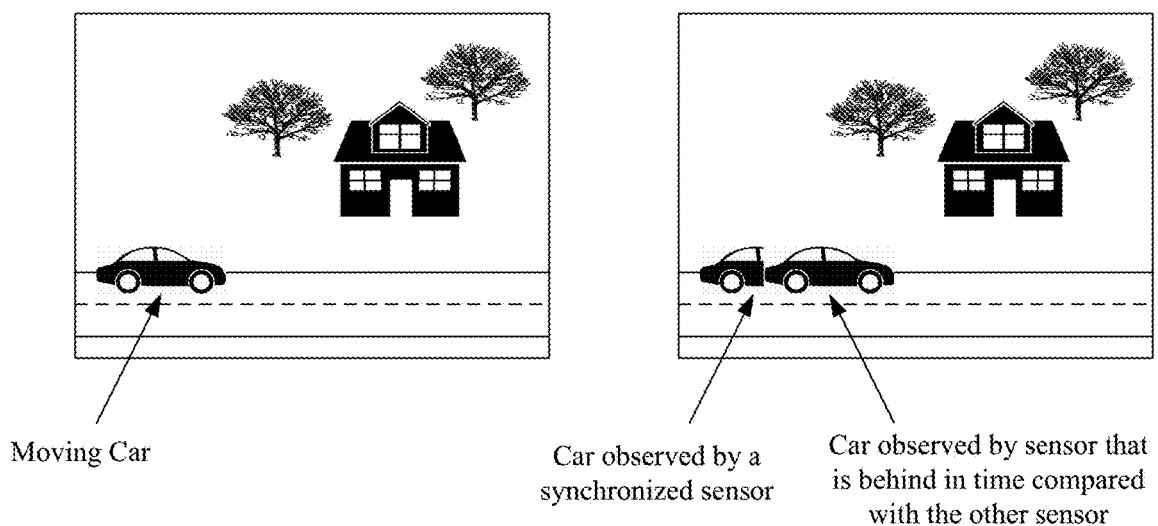
FIG. 4 is an exemplary diagram showing the effects of the use of multiple cameras having different properties on an image.

In multi-camera scenarios where the sensor characteristics are different (e.g., different megapixels, different frame rates, different focal lengths, etc.), synchronized image capture can mitigate many image quality (IQ) problems in downstream processing. However, due to ERS, it is not sufficient to synchronize the start of exposure and read-out. Even if the top left pixel in the image sensor array starts synchronized, later pixels may be read out of sync due to differences in sensor characteristics. As shown for example in FIG. 3, it takes a longer time t2 to read out a portion of the tele image (the entire line) than the time t1 to read out the corresponding portion of the wide image. A consequence of the timing mismatch is shown in FIG. 4, where the relative motion of a car due to lack of synchronization may change an estimation by the processing unit of the disparity or depth. That timing mismatch may cause downstream problems in a variety of applications (e.g. W/T fusion, portrait mode, etc.).

Figure 5:
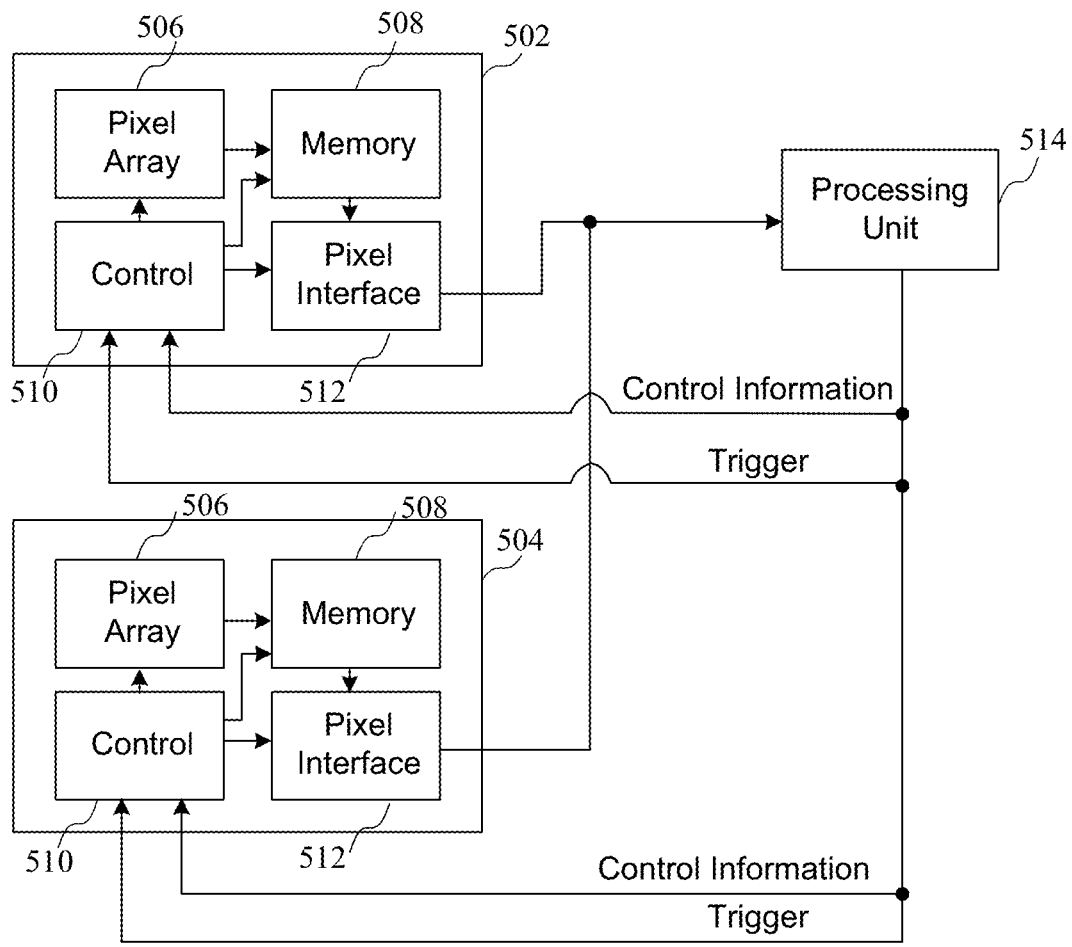
FIG. 5 is an exemplary block diagram of a circuit for synthesizing images from multiple cameras having different properties.

Turning now to FIG. 5, a block diagram of a circuit for synthesizing images from multiple cameras having different properties is shown. The circuit of FIG. 5 comprises a first image sensor 502 and a second image sensor 504. Each of the image sensors 502 and 504 comprises a pixel array for storing image data (i.e. pixel values associated with an image), and a memory 508 coupled receive the image data from the pixel array 506 and control signals from a control circuit 510. The memory is coupled to a pixel interface 512 that provides image data to a processing unit 514.

Even if a CMOS sensor of a pixel array were equipped with different circuitry to control the ERS rate and an attempt is made to match the worst-case sensor, the sensor must transmit pixel data to the processing unit faster than the interface to the processing unit may be able to receive the pixel data. For example, in the case of a dual camera having a wide angle (often referred to as wide or W) sensor and telephoto or zoom (referred to as tele or T) sensor with a 2× focal length difference, the central quarter of a line of the wide image must be read out at the same speed as a full line of the tele image for perfect synchronization. As a result, it is necessary that the tele camera interface must be able to support 4× the speed of the wide angle sensor, which may not be possible or practical.

If the tele image sensor interface cannot support the 4× speed of the wide image sensor camera interface, the processing unit must be equipped to process image data from multiple sensors that is out of sync, and be able to address such synchronization problems. However, this requires the processing unit to address parallax problem as well as synchronization problems. That is, the processing unit must determine if differences between the images from a multi-camera system is due to lack of synchronization (e.g., moving object) or due to parallax. As such, this is an ill-posed problem that may be difficult for the processing unit to solve. For perfect discrimination of parallax or object motion, either parallax should be zero (i.e. the cameras are optically aligned, which is not feasible in the form factor of consumer electronic devices, or lab scenes at fixed depth only, which is not practical), or cameras need to be perfectly synchronized. If the cameras can somehow be synchronized for the entirety of the image, the processing unit only has to handle parallax problem in multi-camera systems, which is a more constrained problem to solve than the combination of the synchronization and parallax problems. The circuit of FIG. 5 having memory on the image sensors 502 and 504 enables synchronization of the two images detected by different image sensors, as will be described in more detail below.

Figure 6:
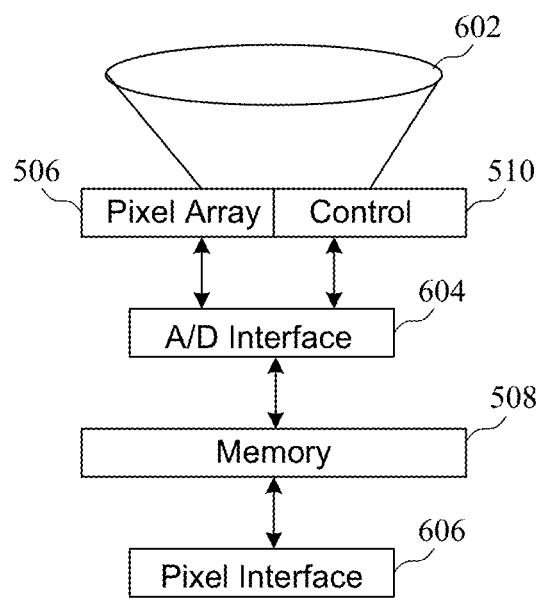
FIG. 6 is an exemplary block diagram showing different interfaces associated with a pixel array and a memory of a camera.

As shown in FIG. 6, a block diagram shows different interfaces associated with a pixel array and a memory of a camera. More particularly, a lens 602 provides data to pixel array 506 under the control of the control circuit 510. An A/D converter 604 enables the conversion of analog values associated with pixels of an image into digital values that can then be stored into the on-sensor memory 508, which may be a dynamic random access memory (DRAM) for example. The pixel interface 606 enables the transfer of image data to the processing unit 514.

The implementation of a sensor as shown in FIG. 6 performs camera synchronization in multi-camera systems by using fast A/D converters and DRAM on camera sensors and eliminates or significantly reduces motion based differences in outputs of cameras in a multi-camera system. This camera synchronization allows downstream processing to focus on addressing parallax and therefore not having to solve the ill-posed problem of handling parallax as well as well as moving object analysis.

Figure 7:
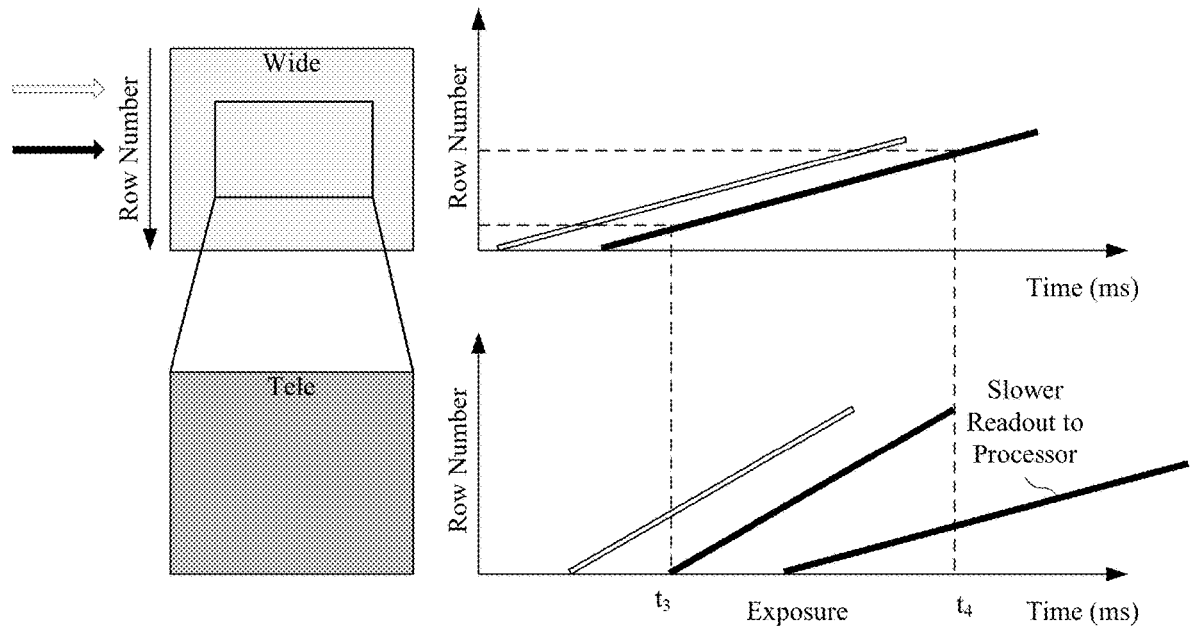
FIG. 7 is an exemplary diagram of showing the capture and read out of image data associated with multiple camera having different properties.

Turning now to FIG. 7, a diagram that shows the capture and read out of image data associated with multiple cameras having different properties and describes the operation of synchronizing the images using the circuits of FIGS. 5 and 6. There are many challenges that are a result of using different image sensors, such as a wide angle image sensor or a tele image sensor. The FOVs for image sensors having different properties often may not line up in time, such as when differences in exposure times may exist due to different sensor characteristics. A row reset may be synchronized using sync/trigger circuitry of the processing unit and software program delays. While it is possible that the read out of wide angle FOV can be slowed down to match tele FOV readout, this would require dynamic FOV adjustment on the wide image, such as during zoom transitions, which may be problematic due to delay required in adjusting sensor side crops, and can also negatively impact video frame rate. The interface from camera to processing unit may be dedicated or shared between multiple cameras using a multiplexer. The processing unit, having time-synchronized image captures, only needs to calculate parallax.

In one embodiment of the invention, each camera is able to configure internal FOV, and read-out speed (i.e. pixel array to memory, which may be ¹⁄₁₂₀ s per frame for tele camera having one half the FOV of the wide camera running at ¹⁄₃₀ s per frame) that is much faster than interface speed to transfer data from the memory to the processor (which may be ¹⁄₃₀ s per frame). The processing unit configures each image sensor by transmitting control signals and triggers to the image sensors 502 and 504 as set forth above. Each image sensor uses the configuration information to readout pixel arrays into memory, allowing image capture to be synchronized. Subsequently, pixel information is transmitted to the processing unit at a slower speed as shown in FIG. 7. That is, the triggering of the tele sensor is set to time t3 to ensure the alignment of rows of the pixels of the tele image to correspond to rows of the pixels in the center of the wide image as shown.

Figure 8:
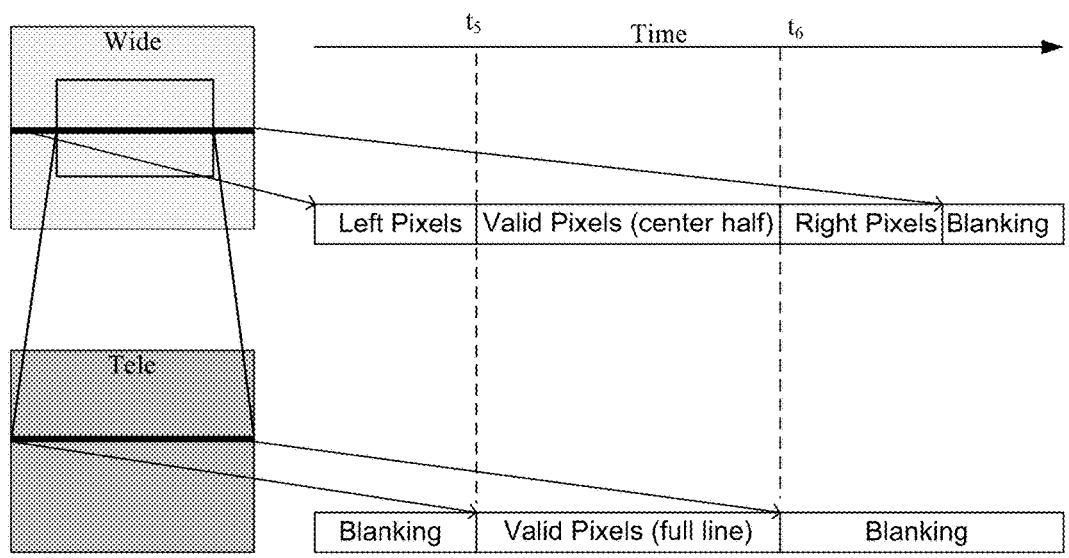
FIG. 8 is an exemplary diagram showing the capture of image data at corresponding times using multiple cameras having different properties.

As shown in FIG. 7, each camera uses the configuration information to readout pixel arrays into memory, allowing image capture to be synchronized. Subsequently, pixel information is transmitted to the processing unit at slower speed. When the processing unit now has time-synchronized image captures, the processing unit only needs to calculate parallax. While the wide image sensor stores image data including the left and right pixels (not stored by the tele image sensor) as shown in FIG. 8, the image data associated with the center half of the wide image corresponds to the full line of the tele image, where $t_5$ and $t_6$ of FIG. 8 corresponds to the readout time of a single row. When corresponding data of both the wide and tele images are stored, they can be read out at a rate that can be accommodated by the processing unit (e.g. the pixel interface 606), which may be slower than the rate of storing image data in the memory of the sensor (e.g. the A/D interface 604).

In the example of FIGS. 7 and 8 having a 2× optical zoom with a wide-tele configuration, a tele camera readout is speeded up to match the matching FOV of a wide angle image. For this example, this requires a 4× increase in read out speed for of the tele image compared with the wide image, which typically may not be handled by the interface speed to the processor. Therefore, a 2× vertical speed-up on as shown in FIG. 7, and a 2× horizontal speedup with blanking inserted to line up pixels within a line, as shown in FIG. 8. DRAM contents are then read out of the processor at a slower rate as shown in FIG. 7. Any additional zoom factor that reduces FOV on both the wide angle and tele image can be handled in the system as is normally done in conventional devices.

Therefore, the invention performs camera synchronization in multi-camera systems by using fast A/D converters and DRAM on the camera sensors and eliminates or significantly reduces motion based differences in outputs of cameras in a multi-camera system. Each camera is able to configure internal FOV, read-out speed (to memory), blanking, and is also able to accept external trigger to synchronize captures, where A/D conversion and readout speed (Pixel Array to Memory) is much faster than the interface speed (typically 1/120 s (or higher) vs 1/30 s per frame) of the processing unit. For example, the processing unit configures each camera/sensor with synchronization related information and sends capture trigger to each camera to synchronize start of capture. FOV, delay and blanking info is calculated to minimize or eliminate time difference between captures from multiple image sensors.

Figure 9:
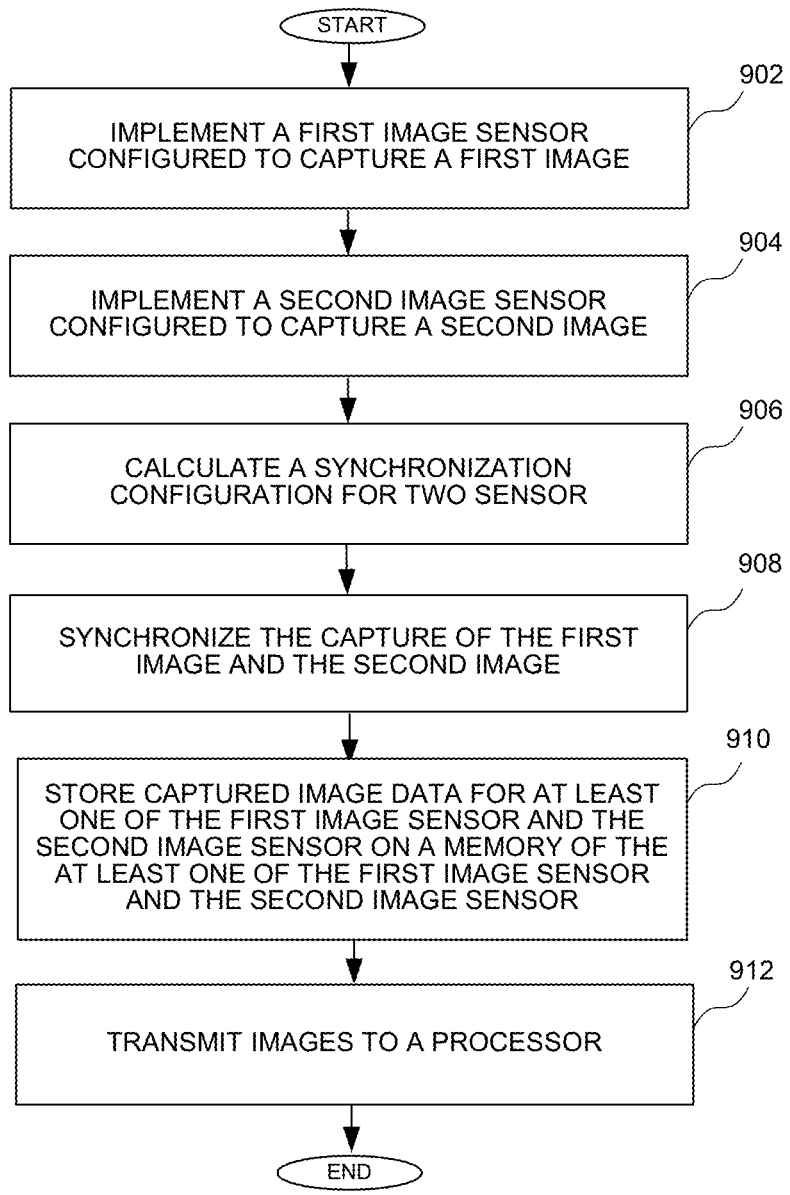
FIG. 9 is an exemplary flow diagram showing a method of synchronizing images from multiple sensors having different properties.

Turning now to FIG. 9, a flow diagram shows a method of synchronizing images from multiple sensors having different properties. A first image sensor, such as image sensor 502, configured to capture a first image is implemented at a block 902. A second image sensor, such as image sensor 504, configured to capture a second image is implemented at a block 904. A synchronization configuration for the first image sensor and the second sensor is calculated at a block 906. The capture of the first image and the second image is synchronized at a block 906. The capture of the first image and the second image could be synchronized using the processing unit 514 as described above. Captured image data for at least one of the first image sensor and the second image sensor is stored on a memory, such as on-sensor memory 508, of the at least one of the first image sensor and the second image sensor at a block 910. The captured images are transferred to a processor at a block 912.

The various elements of the methods of FIG. 9 may be implemented using the circuits of FIGS. 1-8 as described, or using some other suitable circuits. While specific elements of the method are described, it should be understood that additional elements of the method, or additional details related to the elements, could be implemented according to the disclosure of FIGS. 1-8.

It should be noted that other variations could be implemented in different implementations. For example, there may be more than 2 cameras in the system. One or more cameras in the system may not have memory and be the baseline camera to which other cameras are synchronized. Depending on camera configurations, some cameras may use high speed interface to read out directly to the processor if bandwidth allows. The processing unit may have dedicated point-to-point pixel interfaces with the camera sensors or through some shared resource, such as a multiplexer switch. An embodiment of the invention provides a method to synchronize image capture in a CMOS sensor based multi-camera systems that must rely on ERS for image capture. In the examples below, a dual camera case is described with Wide-Tele configuration (with 2× optical zoom), but the embodiment of the invention is easily extendable to more than two cameras of different characteristics such as different resolutions or FOVs.

It can therefore be appreciated that new circuits for and methods of synchronizing images from multiple sensors having different properties have been described. It will be appreciated by those skilled in the art that numerous alternatives and equivalents will be seen to exist that incorporate the disclosed invention. As a result, the invention is not to be limited by the foregoing implementations, but only by the following claims.

I claim:

1. A method of synchronizing images from multiple image sensors having different properties, the method comprising:
   synchronizing a capture of a first image using a first image sensor having a first pixel array and a capture of a second image using a second image sensor having a second pixel array;
   reading out at least one of (a) the captured first image from the first pixel array or (b) the captured second image of the second pixel array at a first rate; and
   storing the at least one of (a) the captured first image on an on-sensor memory of the first image sensor coupled between the first pixel array of the first image sensor and a first pixel interface coupled to a processor, or (b) the captured second image on an on-sensor memory of the second image sensor coupled between the second pixel array of the second image sensor and a second pixel interface coupled to the processor;
   wherein the at least one of the captured first image stored on the on-sensor memory of the first image sensor or the captured second image stored on the on-sensor memory of the second image sensor is provided to the processor at a second rate that is slower than the first rate.

2. The method of claim 1 wherein storing the at least one of (a) the captured first image on an on-sensor memory of the first image sensor, or (b) the captured second image on an on-sensor memory of the second image sensor comprises storing captured image data on the on-sensor memory of the first image sensor and the on-sensor memory of the second image sensor.

3. The method of claim 1 wherein a read-out speed of pixel values from the first pixel array to the on-sensor memory of the first image sensor is adjusted to match a read-out speed of the matching field of view of the second pixel array on second image sensor.

4. The method of claim 1 wherein synchronizing the capture of the first image and the second image comprises triggering the first image sensor to capture the first image at a first time and triggering the second image sensor to capture the second image at a second time.

5. The method of claim 1 wherein storing the at least one of (a) the captured first image on an on-sensor memory of the first image sensor, or (b) the captured second image on an on-sensor memory of the second image sensor comprises storing the at least one of the captured first image or the captured second image using a first interface at the first rate, the method further comprising transferring the stored captured first image or the captured second image from the on-sensor memory at the second rate that is slower than the first rate.

6. The method of claim 1 wherein image data of a full line of a frame is read out of the first image sensor in the same time as image data for a portion of the frame that corresponds with the field of view of the full line of the first image sensor is read out of the second image sensor.

7. An electronic device, comprising:
   a first image sensor having a first pixel array configured to capture a first image;
   a second image sensor having a second pixel array configured to capture a second image; and
   a processor coupled to the first image sensor and the second image sensor, wherein the processor:
     synchronizes the capture of the first image and the second image;

reads out at least one of the captured first image from the first pixel array or the captured second image of the second pixel array at a first rate; and stores captured image data for at least one of the first image sensor and the second image sensor on an on-sensor memory coupled between at least one of the first pixel array of the first image sensor and the second pixel array of the second image sensor;

wherein the at least one of the captured first image stored on the on-sensor memory of the first image sensor or the captured second image stored on the on-sensor memory of the second image sensor is provided to the processor at a second rate that is slower than the first rate.

8. The electronic device of claim 7 wherein storing at least one of (a) the captured first image on an on-sensor memory of the first image sensor, or (b) the captured second image on an on-sensor memory of the second image sensor comprises storing captured image data on the on-sensor memory of the first image sensor and the on-sensor memory of the second image sensor.

9. The electronic device of claim 7 wherein a read-out speed of pixel values from the first pixel array to the on-sensor memory of the first image sensor or the second image sensor is adjusted to match a read-out speed of the matching field of view of the second pixel array on second image sensor.

10. The electronic device of claim 7 wherein synchronizing the capture of the first image and the second image comprises triggering the first image sensor to capture the first image at a first time and triggering the second image sensor to capture the second image at a second time.

11. The electronic device of claim 7 wherein storing at least one of (a) the captured first image on an on-sensor memory of the first image sensor, or (b) the captured second image on an on-sensor memory of the second image sensor comprises storing the at least one the captured first image or the captured second image using a first interface at the first rate, the method further comprising transferring the stored captured first image or the captured second image from the on-sensor memory at the second rate that is slower than the first rate.

12. The electronic device of claim 7 wherein image data of a full line of a frame is read out of the first image sensor in the same time as image data for a portion of the frame that corresponds with the field of view of the full line of the first image sensor is read out of the second image sensor.

13. The electronic device of claim 12 wherein the processor further calculates parallax based upon image data from the first image sensor and the second image sensor.

14. A non-transitory computer-readable storage medium having data stored therein representing instructions executable by a processor to perform a method comprising:

synchronizing a capture of a first image using a first image sensor having a first pixel array and a capture of a second image using a second image sensor having a second pixel array;

reading out at least one of (a) the captured first image from the first pixel array or (b) the captured second image of the second pixel array at a first rate; and storing the at least one of (a) the captured first image on an on-sensor memory coupled between the first pixel array of the first image sensor and a first pixel interface coupled to the processor, or (b) the captured second image on an on-sensor memory coupled between the second pixel array of the second image sensor and a second pixel interface coupled to the processor;

wherein the at least one of the captured first image stored on the on-sensor memory of the first image sensor or the captured second image stored on the on-sensor memory of the second image sensor is provided to the processor at a second rate that is slower than the first rate.

15. The non-transitory computer-readable storage medium of claim 14 wherein storing at least one of (a) the captured first image on an on-sensor memory of the first image sensor, or (b) the captured second image on an on-sensor memory of the second image sensor comprises storing captured image data on the on-sensor memory of the first image sensor and on the on-sensor memory of the second image sensor.

16. The non-transitory computer-readable storage medium of claim 14 wherein a read-out speed of pixel values from the first pixel array to the on-sensor memory of the first image sensor or the second image sensor is adjusted to match a read-out speed of the matching field of view of the second pixel array on second image sensor.

17. The non-transitory computer-readable storage medium of claim 14 wherein synchronizing the capture of the first image and the second image comprises triggering the first image sensor to capture the first image at a first time and triggering the second image sensor to capture the second image at a second time.

18. The non-transitory computer-readable storage medium of claim 14 wherein storing at least one of (a) the captured first image on an on-sensor memory of the first image sensor, or (b) the captured second image on an on-sensor memory of the second image sensor comprises storing the at least one the captured first image or the captured second image using a first interface at the first rate, the method further comprising transferring the stored captured first image or the captured second image from the on-sensor memory at the second rate that is slower than the first rate.

19. The non-transitory computer-readable storage medium of claim 14 wherein image data of a full line of a frame is read out of the first image sensor in the same time as image data for a portion of the frame that corresponds with the field of view of the full line of the first image sensor is read out of the second image sensor.

20. The non-transitory computer-readable storage medium of claim 19 further comprising calculating parallax based upon image data from the first image sensor and the second image sensor.

* * * * *